United States Patent [19]
Vorhis

[11] Patent Number: 5,265,847
[45] Date of Patent: Nov. 30, 1993

[54] SQUEEZE VALVE WITH AUGMENTED SEALING

[76] Inventor: Daniel J. Vorhis, P.O. Box 4183, Seattle, Wash. 98104

[21] Appl. No.: 55,547

[22] Filed: May 3, 1993

[51] Int. Cl.⁵ .................. B65D 90/56; F16K 13/00
[52] U.S. Cl. ............................ 251/342; 251/7; 251/348; 222/513; 222/529; 222/547
[58] Field of Search ............... 222/490, 513, 529, 547; 251/7, 8, 342, 348; 604/34, 246, 250, 256

[56] References Cited

U.S. PATENT DOCUMENTS

| 274,447 | 3/1883 | Kennish | 251/342 |
|---|---|---|---|
| 2,518,165 | 8/1950 | Millard | 251/342 |
| 2,674,064 | 4/1954 | Gassaway | 251/348 |
| 2,755,060 | 7/1956 | Twyman | 251/342 |
| 3,512,748 | 5/1970 | Wilson | 251/8 |
| 4,142,645 | 3/1979 | Walton | 251/342 |
| 4,690,375 | 9/1987 | Vorhis | 251/342 |
| 4,913,401 | 4/1990 | Handke | 251/342 |
| 4,968,294 | 11/1990 | Salama | 251/342 |

*Primary Examiner*—George L. Walton
*Attorney, Agent, or Firm*—Robert W. Jenny

[57] ABSTRACT

A self closing squeeze valve comprising a resilient and deformable valve body having a cavity into which a wafer made of closed cell foam with a smooth surface is permanently inserted, causing a normal state of blockage and seal. Lips are provided across the opposing broad surfaces of the cavity, aligned normal to the direction of flow through the valve, to augment sealing by the wafer. Manual pressure on the valve body causes both components to deform to form a passage allowing flow through the valve.

2 Claims, 2 Drawing Sheets

SQUEEZE VALVE WITH AUGMENTED SEALING

BACKGROUND OF THE INVENTION

1. Field

This invention is in the general field of dispensing apparatus and specifically valves made of flexible material and operated by flexing of the material; i.e. squeezing the valve. More specifically it is in the field of such valves which can be located at the outflow end of a conduit so that when the valve is closed and the flow stopped there is a minimum of residual flow.

2. Prior Art

The prior art to the subject invention is the valve disclosed in U.S. Pat. No. 4,690,375. That valve comprises a hollow elastomeric body having an inlet and an outlet and, in the preferred embodiment, one wafer-like part fitted into the hollow interior of the body. The shapes of the interior of the body and the wafer-like part are such that when the valve is at rest the wafer blocks flow from the inlet to the outlet. When the body is distorted by finger pressure the wafer-like part, termed the wafer for purposes of this disclosure, also is distorted and a passage is opened, permitting flow through the valve. The body of the valve and the cavity in it are essentially elliptical in side (elevational) view and in cross section. The distortion forces are applied at the ends or the cross sectional ellipse midway between the inlet and outlet. The distortion tends to transform the cross sectional shape from essentially elliptical towards circular.

In the continued development and use of the valve disclosed in the above mentioned patent certain problems have become evident, the solutions for which constitute improvements in the basic valve. One problem was that too much finger pressure was needed to distort the valve. The second was that increased pressure against sealing surfaces tended to force the sealing surfaces apart, allowing leakage, rather than force the surfaces together in a positive seal.

The third problem faced was one of part cost. Solvent-resistant elastomeric wafer materials, necessary for the gasoline-dispensing application described in the prior art, of the requisite softness are typically molded in a relatively time-consuming and expensive thermoset molding and vulcanizing process rather than the less expensive thermoplastic injection molding process. Use of certain closed-cell foams allows use of harder, more solvent-resistant base polymers while, because of the entrained air in the foam, providing the necessary flexible and conforming properties for a effective seal. Simple closed-cell foam parts can be thermal/pressure formed out of sheet stock, and are much less expensive to form per part than thermoset-molded/vulcanized parts. The objectives of the invention are to make the valve easier to distort (open), to cause the sealing surfaces to seal more tightly with increased pressure, while reducing total cost of the valve.

SUMMARY OF THE INVENTION

The subject invention is a squeeze valve which comprises a hollow elastomeric body having an inlet and an outlet. A wafer-like part, termed a wafer for purposes of this disclosure, fits into the hollow interior of the body. The shapes of the interior and the wafer are such that when the valve is at rest the wafer blocks flow from the inlet to the outlet. When the valve is distorted by finger pressure, the wafer and body distort such that a passage is formed permitting flow through the valve. In a preferred embodiment the wafer is a body of revolution about the minor axis of its elliptical cross sectional shape. The wafer has an interference fit in the interior of or cavity in the valve body. The inlet and outlet have a common axis which is normal to the axis of revolution of the wafer and the cavity. The opposing saucer shaped surfaces of the cavity each comprise a gill-like lip which faces the inlet and is oriented in an arc that extends approximately perpendicular to the inlet/outlet axis across the wafer. The edge of each lip presses against the wafer to prevent passage of fluid and fluid pressure forces the lips against the wafer, ensuring a positive seal.

The wafer is molded from closed cell plastic foam with a smooth exterior. This type of material is easier to deform (essentially in column failure) than a solid or hollow wafer made from the same solvent resistant plastic, all solvent resistant plastics being relatively stiff.

The invention is described in more detail in the following description with reference to the attached drawings.

DETAILED DESCRIPTION OF THE INVENTION

Figure 1:
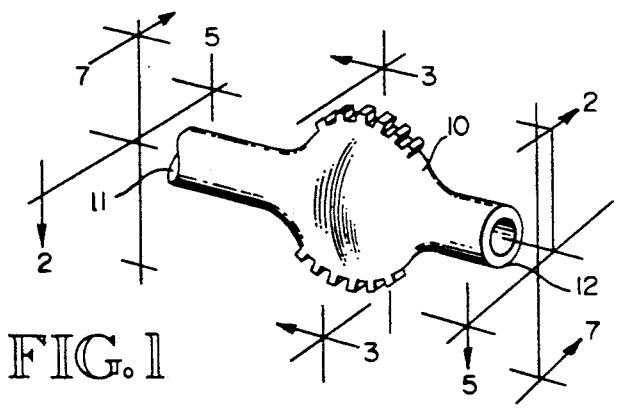
FIG. 1 is a perspective view of the subject valve.
Figure 2:
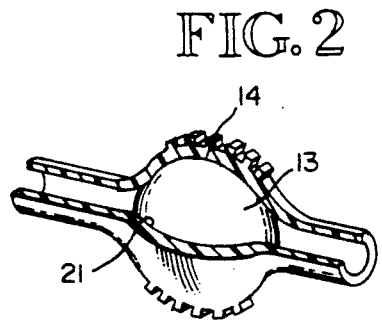
FIG. 2 is a sectioned view taken at 2—2 in FIG. 1, showing the wafer in the cavity in the body and the location of the sealing lips.

The subject invention is a squeeze valve, shown in perspective in FIG. 1 and comprising a body 10 having an inlet 11 and an outlet 12. FIG. 2, a sectioned view of the valve taken at 2—2 in FIG. 1, shows wafer 13 installed in cavity 14 in the body. The wafer has an interference fit in the cavity and, when the valve is in its at rest, state blocks flow through the valve. Lip edge 21 as described below is shown.

Figure 3:
FIG. 3 is a section taken at 3—3 in FIG. 1.

FIG. 3 is a section taken at 3—3 in FIG. 1, showing the wafer filling the cavity.

Figure 4:
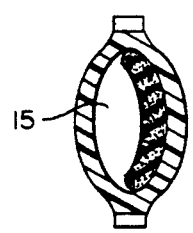
FIG. 4 is a sectional view similar to that of FIG. 3 but illustrating the valve distorted to allow passage of fluid.

In FIG. 4, showing the section of FIG. 3 forced into its deformed, open state finger pressure, the body is tending toward a circular cross sectional shape and the wafer has buckled to one side. Passage 15 is thus formed, allowing flow through the valve. In this state at least one lip is out of contact with the water.

Figure 5:
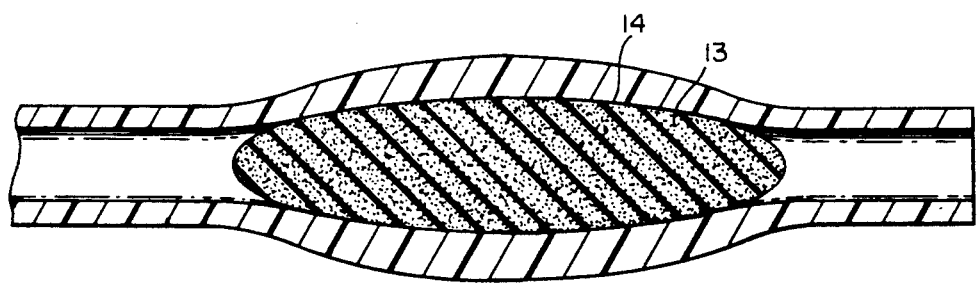
FIG. 5 is a sectional view taken at 5—5 in FIG. 1 and showing the prior art configuration.
Figure 6:
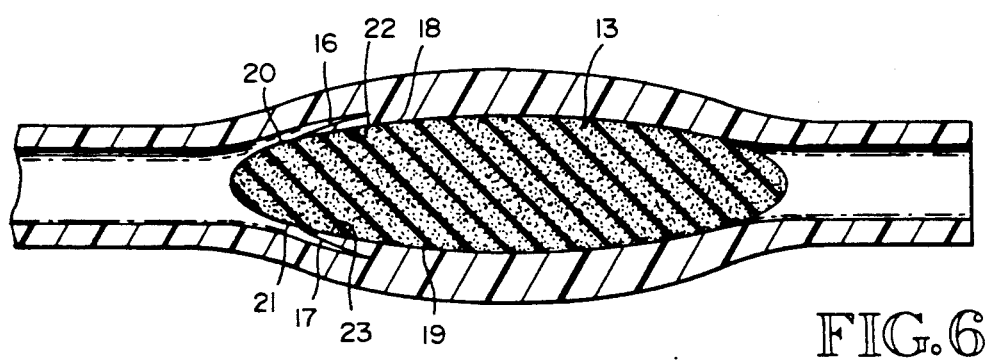
FIG. 6 is a sectional view similar to FIG. 5 but showing the sealing lips.

FIG. 5 is a section taken at 5—5 in FIG. 1 showing the prior art configuration of the valve in its at rest state. FIG. 6 is a similar section showing the configuration of the subject valve. Lips 16 and 17 are, formed in the cavity walls 18 and 19 respectively and sealing edges 20 and 21 of the lips press against the wafer 13 to provide seals preventing flow past the major surfaces 22 and 23 of the wafer. Increased inlet pressure tends to force the lips more firmly against the wafer surfaces. The flexibility of the lip edges provides excellent sealing, accommodating irregularities of the wafer surfaces.

Figure 7:
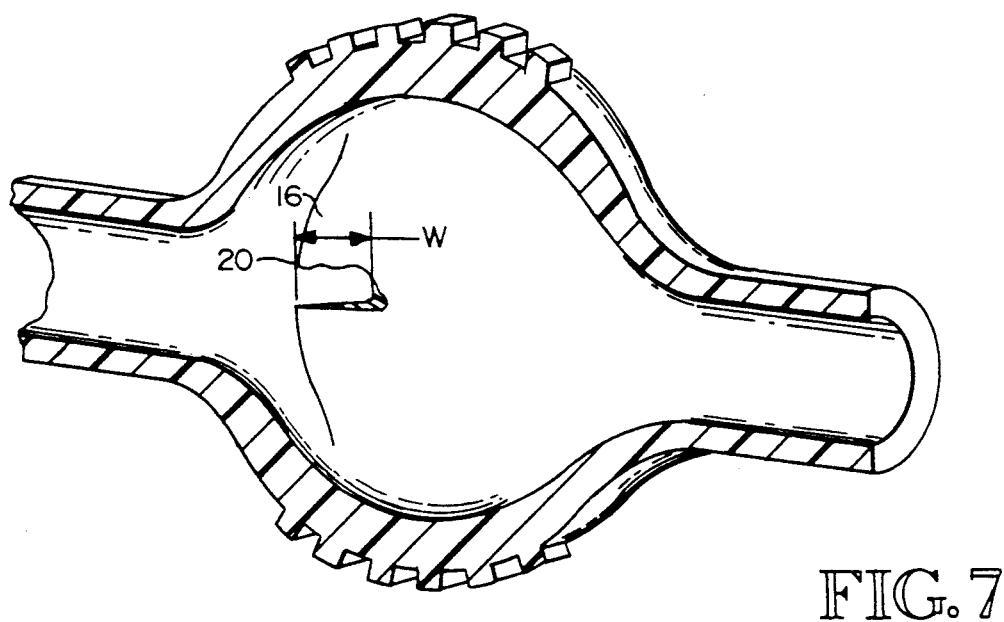
FIG. 7 is a sectional view taken at 7—7 in FIG. 1, further illustrating a sealing lip.

In this embodiment of the invention the surface of the cavity comprises essentially circular cavity walls 18 and 19 joined at their peripheries by arc shaped annular surfaces 24 and 25 (FIG. 7).

FIG. 7, a sectional view taken at 7—7 in FIG. 1, shows lip 16 extending all the way across the cavity and oriented such that edge 20 is normal to the long axis of the valve. Width W of the lips is a maximum at the center and reduces to zero at the extremities of the lips.

The wafer in the subject valve is made of closed cell foam with a smooth surface. Such materials include Evalite (TM), made by Monarch Rubber Co. and Insulite (TM), made by Rubberlite, Inc. When made of such material the wafer is relatively easily deformed when the valve is squeezed but is still substantial enough in compression to serve its purpose as a blockage in the valve in its at-rest state.

It is considered to be understandable from the above description that the subject invention meets its objectives. The making of the wafer from closed cell foam makes the valve considerably easier to squeeze. The making of the wafer from closed cell foam makes the valve considerably easier to squeeze, while at the same time reducing the total cost of the valve. The incorporation of the lips allows a more positive seal as the pressure difference across the valve in the direction of flow increases.

It is also considered to be understood that while one embodiment of the invention is disclosed herein, other embodiments are possible within the scope of the invention which is limited only by the attached claims.

I claim:

1. A self-closing squeeze valve having a long axle, an at rest, closed state ana a deformed, open state, and comprising:
   a body,
   at least one resilient and deformable wafer,
   said body being resilient and deformable and having:
      a longitudinal axis,
      an inlet port,
      a cavity,
      an outlet port,
      said inlet port, said cavity and said outlet port being interconnected to form a fluid flow passage through said body said passage having a first cross sectional area in a plane essentially transverse to said longitudinal axis of said body as formed and when at rest, and
   a second cross sectional area in said plane with said body deformed,
   said second cross sectional area being larger than said first cross sectional area,
   said at least one wafer being inserted in said cavity and having a third cross sectional area larger than said first cross sectional area and smaller than said second cross sectional area, whereby, with said at least one wafer inserted into said cavity, said body is deformed to adapt said first cross sectional area to essentially equal said third cross sectional area to close said passage,
   said cavity having a surface essentially comprising first and second opposing and essentially circular surfaces having first and second peripheries and annular surfaces having arc shaped cross sections joining said first and second peripheries.
   said cavity further comprising a first lip formed into said first essentially circular surface and a second lip formed into said second essentially circular surface, said lips facing said inlet port and extending from and spaced away from said circular surfaces along a portion thereof and having first and second sealing edges, said first and second sealing edges being essentially perpendicular to said longitudinal axis, said edges contacting said wafer when said valve is in said at rest state,
   whereby said edges of said lips are sealingly pressed against said wafer by the force of inlet fluid flow between said lips and said portions of said circular surfaces, augmenting the sealing of said valve and, when said valve is in said deformed state, said passage is deformed to said second cross sectional area such that said valve is in said deformed state such as by finger pressure applied by an operator, and said edge of at least one of said lips is out of contact with said wafer to allow fluid flow to pass through said body.

2. The valve of claim 1 in which said wafer is made of closed cell foam and has a smooth surface.

* * * * *